Aug. 29, 1961 R. A. HILBOURNE 2,998,487
TRANSISTOR SWITCHING ARRANGEMENTS
Filed April 26, 1957
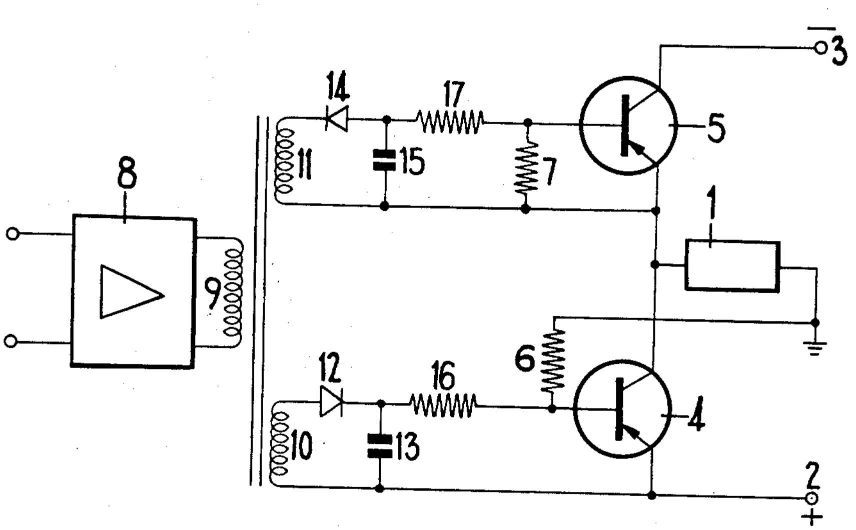
INVENTOR
ROBERT ARTHUR HILBOURNE
BY
Kirschstein, Kirschstein & Ottinger
ATTORNEYS United States Patent Office 2,998,487

Patented Aug. 29, 1961

2,998,487

TRANSISTOR SWITCHING ARRANGEMENTS

Robert Arthur Hilbourne, London, England, assignor to The General Electric Company Limited, Magnet House, Kingsway, London, England Filed Apr. 26, 1957, Ser. No. 655,343

Claims priority, application Great Britain Apr. 30, 1956

2 Claims. (Cl. 178—66)

This invention relates to transistor switching arrangements for use in alternating current telegraph systems, and, more particularly, to switching arrangements wherein junction transistors are utilized as switching elements operable in response to a modulated alternating current voltage of substantially rectangular modulation waveform to switch a load for supply from a plurality of different constant voltage sources.

It is known that a junction transistor can be used as a satisfactory switching element by connecting the collector electrode and either the emitter electrode or the base electrode in a circuit in which switching is required, and applying between the emitter and base electrodes a trigger voltage of such a form that the transistor is alternately in a high impedance condition and a low impedance condition. It is preferable that in the high impedance condition the transistor should be cut off, that is to say in a condition in which substantially no emitter current, and therefore only a very small collector current, flows in the transistor, and that in the low impedance condition the transistor should be bottomed, that is in a condition in which the input current is so large that any further increase of this current does not result in a significant change in the collector current; where this is so the power dissipated in the transistor in either the low impedance condition or the high impedance condition is very small, so that, provided that a short time is taken for the transistor to change from one condition to the other, the transisor may be used for switching powers greatly in excess of those which it is capable of handling when used as a conventional amplifier.

According to the invention, a switching arrangement operable in response to a modulated alternating voltage of substantially rectangular modulation waveform comprises a plurality of junction transistors each having emitter, base and collector electrodes, the transistors being connected in a plurality of current paths which extend between one end of a load, whose other end is arranged to be maintained in operation at a fixed potential, and different ones of a plurality of points arranged to be maintained in operation at different fixed potentials which differ from the first fixed potential, each current path including the collector electrode and one of the other electrodes of at least one of the transistors and the transistors being connected in such a sense that with said potentials applied collector currents will flow in the normal direction through all the transistors, means for deriving a plurality of trigger voltages of substantially rectangular waveform by detection of the modulated alternating voltage, there being one trigger voltage for each current path, and means for applying each trigger voltage between the emitter and base electrodes of at least one translator in the corresponding current path so that all the transistors in that current path are alternately in a high impedance condition and in a low impedance condition, the respective trigger voltages being so phased that the latter condition holds for only one current path at a time.

One particular application which I have envisaged for a transistor switching arrangement according to the invention is as a replacement for the output relay conventionally utilised to control the operation of a telegraph receiving instrument in an electric telegraph receiver. In this case, the load referred to above incorporates the actuating element of the telegraph receiving instrument, and the trigger voltages are arranged to be derived in response to the received telegraph signals; the number of current paths will then normally be two, the current paths being respectively connected to points arranged to be maintained in operation at fixed potentials of opposite polarity with respect to said first fixed potential. For example, in an amplitude modulated voice frequency telegraph system the received signals consist of trains of alternating current pulses, which may be rectified to provide the trigger voltages. The invention may equally well be applied in frequency shift voice frequency telegraph systems, in which the received signal consists of a continuous audio frequency tone whose frequency is periodically changed between two discrete values; in this case the trigger voltages may be produced by applying the received signal to one or more conventional frequency discriminator circuits.

One arrangement in accordance with the invention will now be described by way of example with reference to the accompanying drawing, which is a circuit diagram of a two-way transistor switching arrangement utilised in a receiver for an amplitude modulated voice frequency electric telegraph system.

Referring to the drawing, the switching arrangement is utilised to connect one end of a load 1, whose other end is earthed, to one or other of two terminals 2 and 3 which are respectively maintained in operation at positive and negative potentials of equal magnitude; this load 1 includes the operating coil of the receiving device of a teleprinter, and may also include other conventional circuit elements. The switching arrangement includes two P-N-P germanium junction transistors 4 and 5; the transistor 4 has its collector electrode connected to the unearthed end of the load 1 and its emitter electrode connected to the positive terminal 2, and the transistor 5 has its emitter electrode connected to the unearthed end of the load 1 and its collector electrode connected to the negative terminal 3. A resistor 6 of relatively high value is connected between the base electrode of the transistor 4 and earth, while a resistor 7 of relatively low value is connected between the base and emitter electrodes of the transistor 5. The received signal, which is in the form of a train of alternating current pulses of substantially rectangular envelope waveform, is fed via a conventional amplifier 8 to the primary winding 9 of a transformer having two secondary windings 10 and 11. Across the winding 10 is connected a rectifier circuit constituted by a rectifier 12 in series with a capacitor 13, and across the winding 11 is connected a rectifier circuit constituted by a rectifier 14 in series with a capacitor 15, the rectifiers 12 and 14 being connected in opposite senses in the two rectifier circuits. The two rectifier circuits are respectively connected to the inputs of the transistors 4 and 5 in the following manner: the junction between the rectifier 12 and the capacitor 13 is connected via a low valued resistor 16 to the base electrode of the transistor 4, while the junction between the winding 10 and the capacitor 13 is connected directly to the emitter electrode of the transistor 4; similarly, the junction between the rectifier 14 and the capacitor 15 is connected via a low valued resistor 17 to the base electrode of the transistor 5, while the junction between the winding 11 and the capacitor 15 is connected directly to the emitter electrode of the transistor 5.

The operation of the receiver is as follows. In the absence of a received pulse, a substantial base current flows in the transistor 4 via the resistor 6, and the value of the resistor 6 is chosen in relation to the potential of the positive terminal 2 so that this current is sufficient to bias the transistor 4 into the bottomed condition. At the same time the transistor 5 is nearly, but not quite, cut off, very small emitter and collector currents flowing in the transistor 5; the resistor 7 is provided in order to keep these currents as low as possible. In this condition of the receiver the voltage between the emitter and collector electrodes of the transistor 4 is very low, so that the unearthed end of the load 1 is maintained substantially at the potential of the positive terminal 2. When a pulse is received and applied to the primary winding 9 of the transformer, the voltages appearing across the secondary windings 10 and 11 are rectified, the rectified voltages appearing across the capacitors 13 and 15 and therefore biassing the the base electrodes of the transistors 4 and 5 with respect to their respective emitter electrodes. The rectifiers 12 and 14 are connected in such senses that the bias voltage applied to the base electrode of the transistor 4 is positive, and is of such a magnitude that the transistor 4 is cut off, while the bias voltage applied to the base electrode of the second transistor 5 is negative and is of such a magnitude that the transistor 5 is bottomed. Thus when a pulse is received the voltage between the collector and emitter electrodes of the transistor 5 becomes very low, while the collector current in the transistor 4 falls to a very low value; the unearthed end of the load 1 is thus switched on reception of a pulse substantially to the potential of the negative terminal 3. At the end of the pulse, the receiver of course reverts to its original condition. The resistors 16 and 17 are provided in order to ensure that the very low input impedances of the transistors 4 and 5 when in the bottomed condition are not shunted directly across the capacitors 13 and 15, so as to prevent the possibility of too heavy a flow of input current in the transistors 4 and 5 and also to eliminate substantially any risk of a ripple voltage being developed at the output of the transistors 4 and 5.

As previously stated, the transistor 5 in the arrangement described above is not quite cut off when no pulse is being received; in certain cases, particularly where high voltages are involved, it would be desirable to ensure that the transistor 5 was positively cut off in this condition of the receiver, by applying to the base electrode a bias voltage which holds it positive with respect to the emitter electrode.

It will be appreciated that in accordance with the invention various modifications are possible in the arrangement described above. In that arrangement, it is the collector and emitter electrodes of each transistor which are connected in the relevant current path between the unearthed end of the load and one of the positive and negative terminals; it is equally possible for the collector and base electrodes of the transistor to be connected in the relevant current path, although the former arrangement is normally preferred because it has the advantage of giving the largest possible power gain between the input and output of the transistor. Further, it is not necessary that all the transistors should be of the same type (P-N-P or N-P-N), and in fact in some cases it may be advantageous to use transistors of both types in the switching arrangement in order to achieve simplification of the arrangements for applying the trigger voltages. Finally, it will be appreciated that the invention may equally well be applied to the provision of switching arrangements in which a load is switched so as to be supplied from more than two different constant voltage sources.

Where high voltages are involved, it may be necessary to provide additional transistors connected in series in each current path, in order to avoid the risk of breakdown of the collector junctions of the transistors, the transistors in each current path being arranged so that the total voltage appearing across them when they are cut off is shared substantially equally between all the transistors.

I claim:

1. A switching arrangement operable in response to a modulated alternating voltage of substantially rectangular modulation waveform, comprising a plurality of junction transistors each having emitter, base and collector electrodes, the transistors being connected in a plurality of current paths which extend between one end of a load and different ones of a plurality of points, means for maintaining said one end of the load at a first fixed potential, means for maintaining said points at different fixed potentials which differ from the first fixed potential, each current path including the collector electrode and one of the other electrodes of at least one of the transistors and the transistors being connected in such a sense that with said potentials applied collector currents will flow in the normal direction through all the transistors, means for deriving a plurality of trigger voltages of substantially rectangular waveform by detection of the modulated alternating voltage, there being one trigger voltage for each current path, and means for applying each trigger voltage between the emitter and base electrodes of at least one transistor in the corresponding current path so that all the transistors in that current path are alternately in a high impedance condition and in a low impedance condition and so that the latter condition holds for only one current path at a time.

2. In an electric telegraph receiver, a switching arrangement according to claim 1 in which the load incorporates the actuating element of a telegraph receiving instrument, the trigger voltages being arranged to be derived in response to received telegraph signals.

References Cited in the file of this patent

UNITED STATES PATENTS

| | | |
|---|---|---|
| 2,424,961 | Bancroft et al. | Aug. 5, 1947 |
| 2,448,336 | Weiner | Aug. 31, 1948 |
| 2,794,856 | Turner | June 4, 1957 |
| 2,839,620 | Waldhauer | June 17, 1958 |
| 2,860,193 | Lindsay | Nov. 11, 1958 |
| 2,868,897 | Hamilton | Jan. 13, 1959 |
| 2,873,367 | Zawels | Feb. 10, 1959 |
| 2,878,380 | Holmes | Mar. 17, 1959 |
| 2,896,029 | Lin | July 21, 1959 |